June 17, 1952 W. G. CARTTER 2,600,616
HEATER AND THERMOSTAT SELECTOR SHIELD THEREFOR
Filed Aug. 9, 1948 3 Sheets-Sheet 1
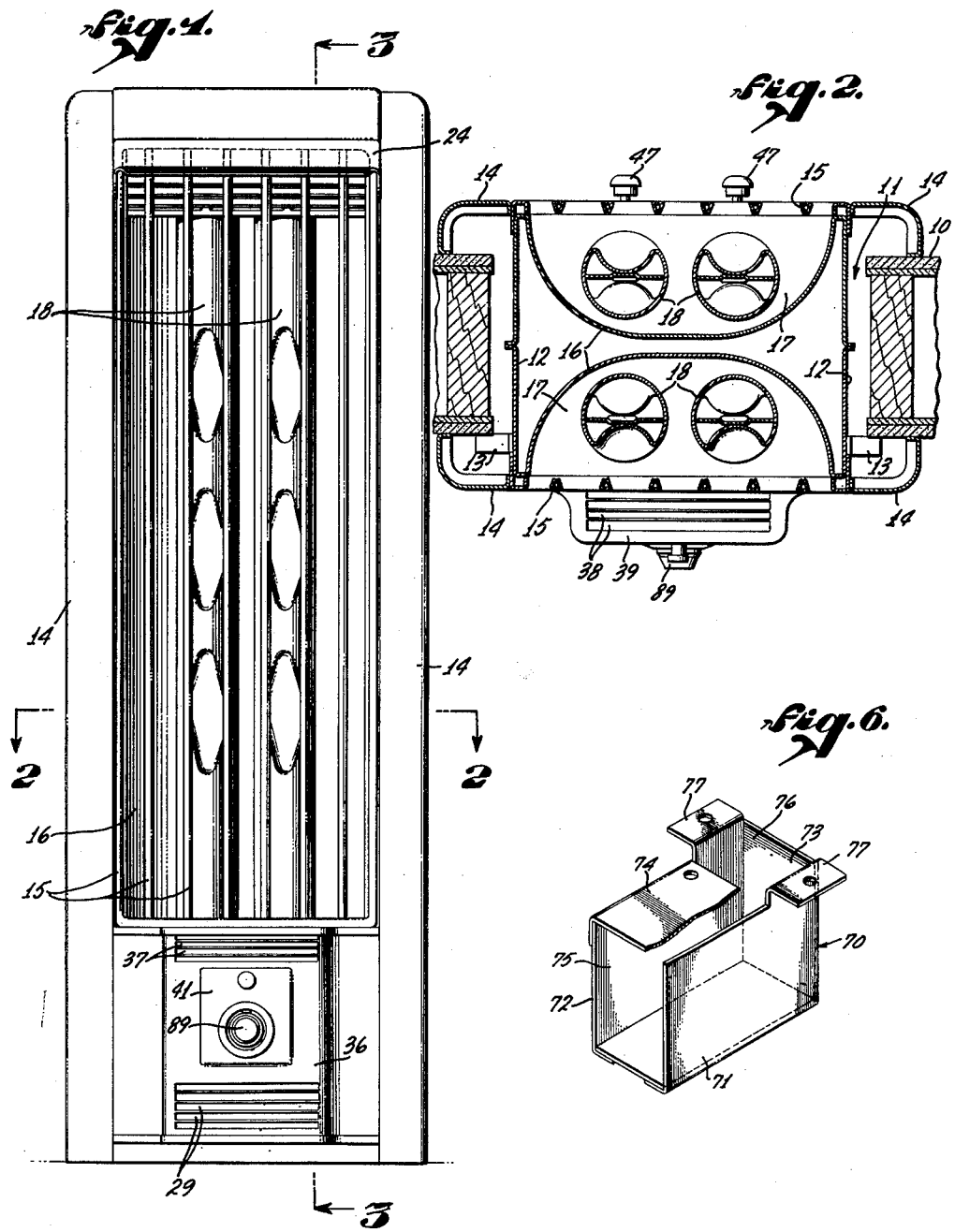
INVENTOR:
WILLIAM G. CARTTER
BY Huebner, Maltby and Beehler
ATTORNEYS.

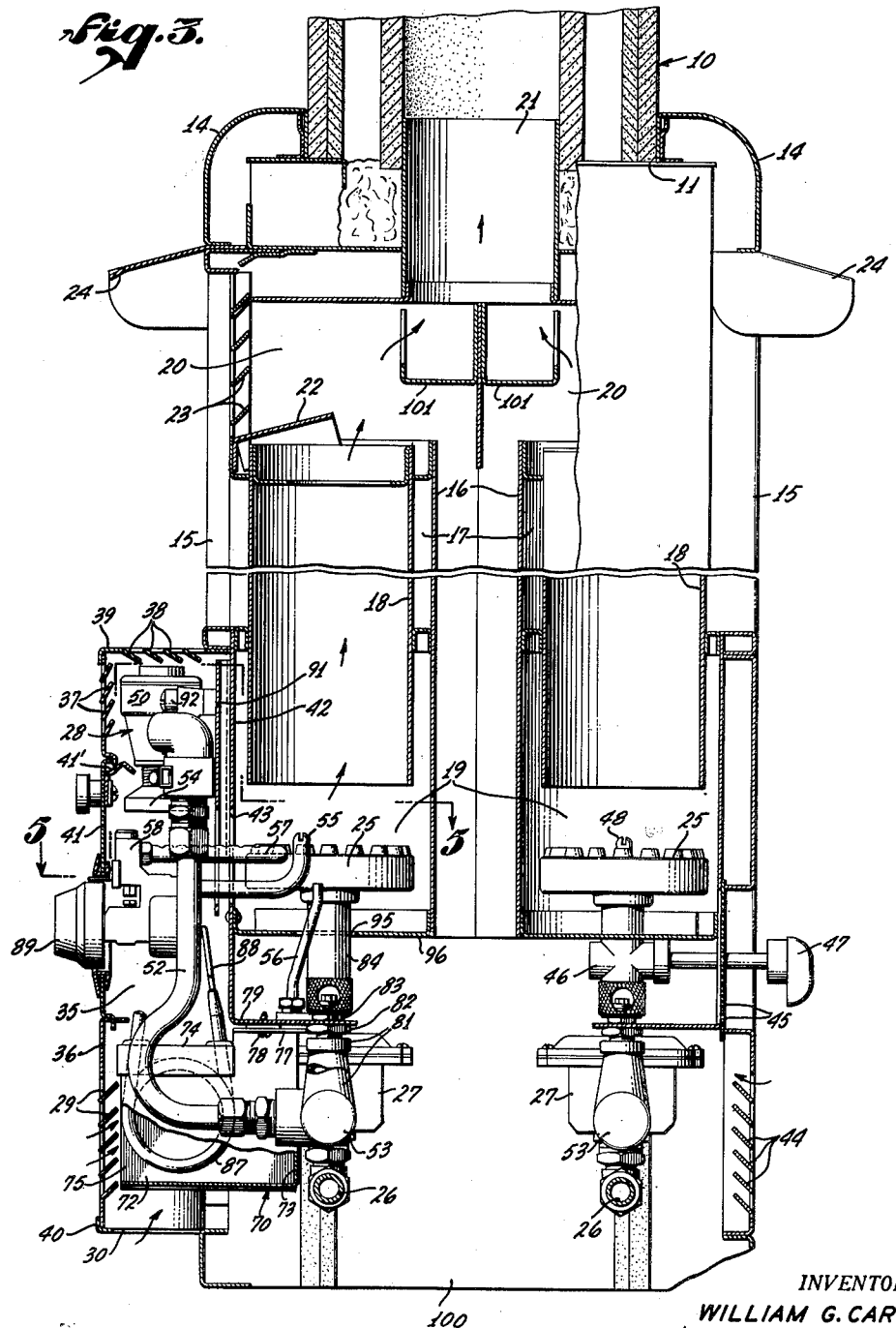

June 17, 1952   W. G. CARTTER   2,600,616
HEATER AND THERMOSTAT SELECTOR SHIELD THEREFOR
Filed Aug. 9, 1948   3 Sheets-Sheet 3

INVENTOR:
WILLIAM G. CARTTER
BY Huebner, Maltby
and Beehler
ATTORNEYS.

Patented June 17, 1952

UNITED STATES PATENT OFFICE 2,600,616

HEATER AND THERMOSTAT SELECTOR SHIELD THEREFOR

William G. Cartter, Monrovia, Calif., assignor, by mesne assignments, to Affiliated Gas Equipment, Inc., Cleveland, Ohio, a corporation of Delaware Application August 9, 1948, Serial No. 43,278

3 Claims. (Cl. 126—91)

The invention relates to thermostat controls and in particular the application of a thermostat control to a heating device.

When heating devices are used to maintain a body of fluid at a selected temperature, the ordinary means of utilizing the control consists of placing a heat-responsive element or bulb in contact with the fluid which is being maintained at a selected temperature so as to be responsive thereto and then to have the element operate a control for the heat unit in order to turn the heat unit on or to shut the heat unit off, depending upon the demand for heat. If the heat unit be gas operated, the control will ordinarily be a gas valve. If the heat unit be electrically operated, the control will ordinarily be a switch of some sort.

When the heating unit is used to operate a space heater, the fluid will naturally be air from the space to be heated, and it is highly desirable that a sample of air be taken from that portion of the space which will result in most effective control by operation of the thesmostat.

If the space to be heated chances to be divided into several different chambers or rooms, the problem remains the same so long as all of the chambers are to be maintained at approximately the same temperature. There are occasions, however, when it may be desirable to maintain different chambers at different temperatures. Different temperatures can, of course, be set up by providing heaters for the different rooms or chambers.

For the sake of economy and convenience, however, it is found highly desirable to heat adjacent rooms or chambers from a single heating unit incorporating one part directed into one room and another part directed into another room. By thus unifying the heating device, installation costs are lowered since the structure of the building need be broken into at only one point and a single draft and combustion air supply provided for.

When a single source of heat is employed in this manner, it becomes less easy to regulate the temperature of one room independently of the temperature of the other especially when automatic regulation is sought. Samples of air from one room will affect the thermostat control in one manner; whereas, samples of air from the other room will affect the thermostat control in another manner, and under ordinary circumstances effective automatic control cannot easily be maintained without resort to rather expensive and complicated construction.

It is, therefore, among the objects of the invention to provide a new and improved means of controlling thermostat action of a heater which is able to accurately sample fluid which is to be heated so that the sample most readily and accurately controls thermostat action.

Another object of the invention is to provide a new and improved thermostat control for a heating device wherein one portion of the device may be accurately subjected to automatic control without interfering with the free manual control of another portion of the device.

Still another object of the invention is to provide a new and improved selector shield for a thermo-responsive element which limits the selection of fluid affecting the heat-responsive element only to a desired portion of the body of fluid which is to be heated and which at the same time effectively excludes the effect of any other fluid.

Further and more specifically, it is among the objects of the invention to provide a new and improved thermostat control device for a dual space heater equipped to heat adjacent chambers from a common heating plant, the thermostat control being so arranged with respect to one only of the heating units that it is responsive to air drawn from that space in the normal course of operation of the heating plant, thereby automatically controlling that portion of the heating plant independently of the other portion.

It is also among the objects of the invention to provide for a two-way panel heater adapted for installation in a partition wall between two rooms a thermostat control for one or more portions of the panel heater, such thermostat control being influenced by a flow of air only from the space which is to be controlled by the respective portion of the panel heater entirely independent of any draft of air from the adjacent space even though the panel heater is provided with a common source of combustion air and a common vent.

Still further among the objects of the invention is to provide a new and improved panel heater adapted for inclusion of a thermostatic control positioned at a location removed sufficiently from the combustion chamber so that the major portion of the thermostatic apparatus may be air washed with fresh air and thus prevented from becoming overheated.

Still another object of the invention is to provide a construction for a panel heater such that a bench assembly may be made of the operative parts which includes the gas control members, thermostatic members, burner members and a draft-directing casing for the thermostatic bulb, in such a manner that the entire bench assembly may be inserted into the panel heater or removed therefrom at any time.

With these and other objects in view, the invention consists in the construction, arrangement and combination of the various parts of the device whereby the objects contemplated are attained, as hereinafter more fully set forth, pointed out in the claims and illustrated in the accompanying drawings, in which:

Figure 1 is a front elevational view of a panel heater adapted to the reception of the thermostat control.

Figure 2 is a cross-sectional view of the heater taken on the line 2—2 of Figure 1.

Figure 3 is a shortened longitudinal sectional view taken on the line 3—3 of Figure 1.

Figure 6 is a perspective view of a draft casing for the thermostat bulb.

Figure 4:
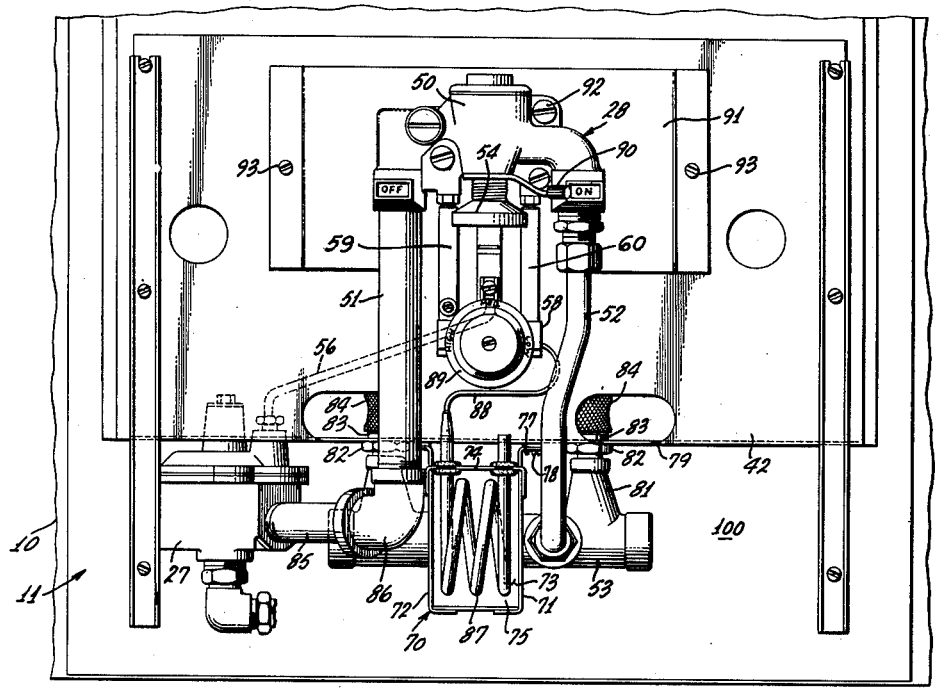
Figure 4 is a front elevational view of the lower portion of the device shown in Figure 1 with the housing removed to afford a clearer view of the thermostat apparatus.
Figure 5:
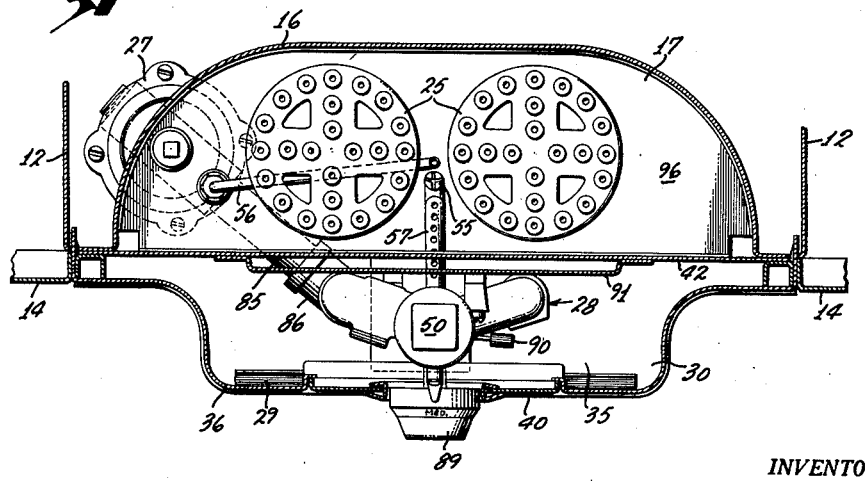
Figure 5 is a partial cross-sectional view taken on the line 5—5 of Figure 3.

For the purpose of illustration, a panel heater has been selected as an environment for the thermostat control device forming the subject matter of the present invention. The panel heater selected is one belonging to a class of heaters frequently described as floor furnaces, wall furnaces, built-in space heaters and the like. An important feature of the invention lies in the fact that it is particularly well adapted to space heaters, portions of which are used to heat more than one room or chamber.

The most frequent use for heaters of the sort adapted for the inclusion of the novel thermostat device is in residences, offices and building structures where the temperature needs to be kept within a comfort range by frequent and automatic opration of the heating element turning the heater on and off as the demand for heat changes. Space heaters of the sort described utilizing gas as a fuel may very readily be equipped with a thermostat control device of the sort herein described as comprising the invention.

In the embodiment chosen for the purpose of illustration, there is shown what is frequently designated as a panel heater so constructed that one side of the heater is adapted to heat one room while a second side of the heater is adapted to heat a second room. The panel heater is shown installed in a partition wall 10 within a space 11 provided for it and consists of a housing 12 provided with necessary brackets 13 adapted to secure the heater in proper position within the space 11 of the partition wall 10.

For the sake of appearence, an ornamental trim 14 is applied on each side, and a grillwork 15 is carried flush with the outer face of the trim. The housing 12 is formed into reflectors 16 forming chambers 17, one on each side, for reflecting heat into one room or the other depending upon the direction in which the reflector faces.

As best shown, perhaps, in Figures 2 and 3, heating stacks 18 are provided in pairs, a pair being located in each reflector chamber. The stacks are identical in detail, and it seems sufficient to state that the stacks extend from a combustion area 19 upwardly to a flue chamber 20 from which the products of combustion may pass outwardly and upwardly through a vent 21 within the partition wall 10. At the top of each stack is a deflector 22 within the flue chamber, and louvers 23 permit access of fresh air into the flue chamber. A canopy 24 may also be provided to more effectively control the circulation of air at the top of the heater.

Burners 25 are located one in each combustion chamber and immediately beneath the respective stack 18. The burners shown are gas burners and are supplied with fuel gas from a gas main 26, from which gas passes through a regulator 27, thence through a thermostat control device 28, and finally to the burners 25.

Air for the burners is taken into the panel heater between louvers 29 and, to some extent, through a passageway 30.

In the embodiment of the invention herein shown and described, there is provided a chamber 35 at the lower part of the heater which, in a sense, extends outwardly away from the main portion of the heater. The chamber is primarily for housing the mechanical portions of the thermostat control at a location separated from the combustion area 19 as much as possible. In order to form the chamber, there is provided a flanged plate 36, the bottom of which contains the louvers 29, previously referred to, and provides also the passageway 30. At the upper portion of the flanged plate are provided additional louvers 37 adjacent the front face, and still other louvers 38 across the top of the chamber. For convenience, the flanged plate 36 may be made removable from a top plate 39 and a bottom angle bracket 40. Removal of the flanged plate provides ready access to all portions of the thermostat apparatus and burner mechanism. For further convenience, there is provided a door or hatch 41 adapted to fit into a corresponding opening in the flanged plate 36 and retained therein by a spring latch 41'. Removal of the door makes convenient the re-lighting of the pilot whenever that might become necessary.

In this connection, it is important to note that a plate 42 lies at the rear of the chamber 35 and, except for an opening 43 therein, provides a partition or barrier separating the chamber 35 from the combustion area 19. Because of this specific arrangement providing the chamber 35, air is free to circulate through the passageway 30, thence upwardly around the thermostat control device 28 and thence outwardly past the louvers 38. Air circulating through the louvers 37 assists in maintaining this air circulation or air wash around the thermostat control device.

All products of combustion in the device illustrated are vented through the vent 21. This being the arrangement, the heating effect of the stacks may be said to constitute radiated heat, the radiated heat being emanated directly from the stacks or reflected by the reflectors.

Except for the presence of the chamber 35, the only difference between the opposite sides of the panel heater is the number and location of air passages by means of which air is taken into the area occupied by the burners. On the left-hand side, the louvers 29, and to some extent, the passage 30, provide means of admitting air which eventually passes to the burners. On the right-hand side, air is admitted primarily through louvers 44 located more closely adjacent the corresponding burners than the louvers 29. Some air may be admitted through apertures 45 located above the louvers 44.

The burners on the right-hand side, as viewed in Figure 3, are designed to be controlled by a hand actuated valve device 46 operated by means of a handle 47. A pilot 48 may be kept burning in order to avoid the use of matches in turning the burner on and off.

The burners on the left side of the device, as viewed in Figure 3 and as further illustrated in Figure 4, are adapted to be automatically controlled by means of the thermostat device 28, a front elevational view of which is illustrated in Figure 4. The thermostat device or thermal responsive fuel control, although substantially conventional in its general form and operation, will be described here in detail sufficient to promote a clear understanding of the structure and operation of the selector shield or draft casing which is included in the inventive subject matter. By way of illustration, the thermostat control device may be considered as incorporating a main valve 50 into which flows fuel gas through a pipe 51 and from which fuel gas flows through a pipe 52 to a manifold 53 which supplies both of the gas burners 25 on the left-hand side of the panel heater, as viewed in Figure 3. Control of the valve 50 is effected by means of a thermal responsive snap disc 54 by means of which the valve device can be turned on and shut off.

A pilot 55 remains burning constantly at a location between the two adjacent burners 25. For proper operation, one side of the pressure regulator 27 must be vented to atmosphere. Should the regulator diaphragm rupture, gas would escape to the room. A tube 56 is therefore disposed between the regulator vent and a region adjacent the pilot burner 55, so that any such escaping gas is directed toward the pilot burner 55, which ignites it and thus prevents its escape, unburned, into the room. Because of the fact that a relatively strong mechanical action is necessary to positively operate the main valve 50, the snap disc 54 is heated by means of a pilot train 57 which communicates for its gas supply with a thermal responsive control unit 58. The thermal control unit is fed by a supply line 59, the rod 60 being an additional support. The pilot train has its lighter end located adjacent the pilot 55. It is significant that the pilot train has flame apertures immediately beneath the snap disc 54 so that when the pilot train is lit, the snap disc may be heated to a relatively high temperature and cause a strong snap action, sufficient to operate the main valve device. Operation and control of the pilot train is effected by a novel thermal responsive device about to be described. Adjacent the lower end of the panel heater, as viewed in Figure 3, there is located a draft casing 70, the form of which may more clearly be discerned in Figure 6. As there shown, the draft casing comprises side walls 71 and 72, one end wall 73 and a top 74. The end opposite the end wall 73 provides a rectangular opening 75. As shown in Figure 6, the top 74 is shorter than the length of the side walls, thereby providing an upper opening 76. For fastening the draft casing in place, there are provided ears 77 extending outwardly from the tops of the side walls 71 and 72, and a screw 78 may be utilized for attaching the draft casing to a bent plate 79.

Having in mind that the draft casing together with the burner mechanism and the thermostatic mechanism are designed for bench assembly as a unit, it is significant to note that upward extending portions 81 of the manifold 53 may be secured to the bent plate 79 by interlocking nuts 82 and 83, and that a neck 84 of each burner 25 may be there secured and the corresponding burner thus securely mounted with relation to the manifold and the bent plate 79.

From an inspection of Figure 4, in company with Figure 3, it will be apparent that the main valve 50 is firmly mounted with respect to the manifold by means of the pipe 52, and that the pressure regulator 27 is, in turn, firmly attached to the main valve by means of the pipe 51 and a nipple 85 which connects to the pipe 51 through an elbow 86.

A thermostat bulb 87 is coiled in a loop small enough to lie within the draft casing 70 in the position illustrated in Figures 3 and 4, the loop being expanded axially so as to substantially fill the draft chamber. A tube 88 connects the bulb with a thermal responsive control unit 58, details of which are conventional and will not be described in detail here. A knob 89 is provided on the thermal responsive control in order to set the device at a "high", "low" or "medium" heating cycle. To further control operation of the device, the main valve is provided with a handle 90 which may be swung from one side to another in order to shut off the main valve or turn on the main valve, as indicated by the "off" and "on" legends visible in Figure 4.

As indicated in Figure 4, a transverse plate 91 may be provided to which the main valve may be attached by means of bolts 92 and this plate, in turn, attached by screws or rivets 93 to the bent plate 79. It will be understood, therefore, that by this construction, the main valve, the thermal responsive control, the manifold, the pressure regulator, and the draft casing may be assembled as a unit on the bent plate 79 and inserted into the panel heater where the bent plate is held in position by a series of screws. The only additional connection necessary is that comprising a coupling 94 by means of which the inlet side of the pressure regulator is attached to the gas line 26.

In operation let it be assumed that the air in a space or chamber adjacent the left side of the partition 10, as viewed in Figure 3, is desired to be kept at a temperature different from the air in a space adjacent the right side of the partition 10. This difference can be maintained in spite of the fact that air from both spaces enters a chamber or space 100 through the louvers 29 and 44, the chamber or space 100 being adapted to contain air which eventually passes upwardly to supply air for combustion for the burners 25 on both sides of the panel heater. From the chamber 100 the mixture of air therein may pass apertures 95 in bottom walls 96 of the corresponding stacks, thereby to reach the corresponding burners 25. Some of the air from the chamber or space 100 passes upwardly on the outside of the reflectors 16, thereby maintaining a circulation of air on the outside of the reflectors so that they do not become overheated. Air passing on the outside of the reflectors moves upwardly into the flue chambers 20 and thence around suitable baffles 101 to the vent 21.

Let it be assumed that it is desired to maintain air in the space on the left-hand side of the partition at a temperature higher than the air at the right-hand side of the partition. The thermal responsive device will then be set at "high." If the air is cool initially, air from the chamber on the left-hand side will pass the louvers 29 and be drawn by normal draft action through the draft casing 70 wherein it will come into contact with the thermostat bulb 87. Because the air is cool, the thermal responsive device will be actuated so as to turn gas into the pilot train 57. Gas reaches the pilot train by traveling first through the supply line 59 into the thermal responsive control unit 58 containing a valve of conventional design, not shown, through which gas passes to the pilot train 57. The train will be ignited from the pilot light and lighted gas will travel from right to left along the pilot train until burners beneath the snap disc 54 are ignited. The snap disc will be accordingly heated and the main valve 50 turned on. Gas will then be conducted from the gas line 26 through pressure regulator 27, the main valve 50, the pipe 51 and manifold 53 to the burners 25 on the left-hand side. Gas in the burners will be ignited by the pilot 55. As the gas is ignited, the stacks 18 on the left side of the panel heater will be heated to a higher temperature than previously and more radiant heat will be thrown into the space on the left-hand side of the panel heater than on the right-hand side. Because of the fact that a draft is continually induced in the stacks 18 on the left-hand side, there will always be a flow of air through the draft casing 70 and, thus, past the thermostat bulb 87. The air thus drawn into the device will be air at the temperature of air in the chamber or space on the left-hand side of the partition. No air from the chamber on the right-hand side of the partition is admitted to come into contact with the thermostat bulb 87 because of the fact that the bulb is shielded by the end wall 73 and side walls 71 and 72 of the draft casing. Hence, no matter what the temperature of the space on the right-hand side of the partition, the temperature of the space on the left-hand side of the partition may be carefully controlled by the automatic thermal responsive mechanism.

When the air in the space on the left-hand side of the partition reaches a desired temperature which, as previously indicated, is the temperature for the high setting, the thermostat bulb will be heated by the warm air to a point where the thermal responsive device will again act, this time to shut off the flow of gas to the pilot train. The snap disc will then be permitted to cool even though the burners 25 remain temporarily ignited. When the snap disc has cooled sufficiently, the main valve 50 will be shut off and the corresponding burners 25 will also be shut off.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

The invention having been herein described, what I claim as new and desire to secure by Letters Patent is:

1. A thermo-controlled heater comprising a housing having oppositely facing openings adapted to serve separated spaces to be heated, separate heating devices disposed within said housing adjacent said openings, partition means within said housing intermediate said heating devices to cause heat from each of the separate heating devices to be directed into the respective spaces served by the particular heating device, means adapted to form a common air passage from the spaces to be heated to the heating devices, and inlets thereto adapted to extend from said separate spaces, operative-medium supply conduits connected to said heating devices and a thermo-responsive control in at least one of the conduits, a thermo-responsive element for the control, and means for directing air from the space served by the heating device having said control in its conduit over the thermo-responsive element and comprising walls forming a conduit within said common air passage having an inlet adapted to face said last mentioned space and an upwardly extending outlet directed toward said last mentioned heating device, said walls comprising a shield against air from the other space.

2. A thermo-controlled panel heater comprising a housing having oppositely facing openings adapted to serve separated spaces to be heated, separate heating stacks disposed within said housing adjacent said openings, partition means within said housing intermediate said heating stacks to cause heat from each of the separate heating stacks to be directed into the respective spaces served by the particular heating stack, burners for said stacks, a common vent for said stacks, means forming a common combustion air passage from the spaces to the burners and inlets to the common combustion air passage adapted to extend from the separate spaces, fuel lines supplying the burners and valves in the fuel lines, a thermo-responsive element for one of said valves and means for directing air from the space served by said one valve to the stack over the thermo-responsive element comprising walls forming a conduit around the thermo-responsive element and located within said common combustion air passage, said conduit having an inlet adapted to face the last identified space in the line of travel of combustion air and an outlet directed away from the inlet in the direction of movement of combustion air, said walls comprising a shield against combustion air from the other space.

3. A thermo-controlled panel heater comprising a housing having oppositely facing openings adapted to serve separated spaces to be heated, separate heating stacks disposed within said housing adjacent said openings, partition means within said housing intermediate said stacks to cause heat from each of the separate stacks to be directed into the respective spaces served by the particular stack, individual burners for said stacks, a common vent for said stacks and means forming a common combustion air supply for the burners, fuel lines supplying the burners and a thermo-responsive valve in at least one of the fuel lines, a thermo-responsive element for the valve and means for directing air from the space served by the stack and burner associated with said last stack over the thermo-responsive element, said means comprising walls forming a conduit within the common combustion air supply having a laterally disposed inlet adapted to face the last identified space in the line of travel of combustion air, a chamber for the thermo-responsive element therewithin immediately adjacent said inlet, and an upwardly extending outlet directed toward the respective burner, said walls comprising a shield against combustion air from the other space.

WILLIAM G. CARTTER.

REFERENCES CITED

The following references are of record in the file of this patent:

UNITED STATES PATENTS

| Number | Name | Date |
|---|---|---|
| 1,022,188 | Geissinger | Apr. 2, 1912 |
| 1,633,066 | Breese | June 21, 1927 |
| 1,742,880 | Stockstrom | Jan. 7, 1930 |
| 1,842,335 | TePas | Jan. 19, 1932 |
| 1,900,520 | Pickup | Mar. 7, 1933 |
| 2,207,979 | Gauger | July 16, 1940 |
| 2,337,484 | McCollum | Dec. 21, 1943 |
| 2,481,630 | Tramontini | Sept. 13, 1949 |